United States Patent [19]
Perry, Jr. et al.

[11] 3,884,660
[45] May 20, 1975

[54] GAS-LIQUID SEPARATOR

[75] Inventors: Marney Dunman Perry, Jr., Mineral Wells, Tex.; Robert A. Graff, Live Oak, Fla.

[73] Assignee: Perry Equipment Corporation, Mineral Wells, Tex.

[22] Filed: Dec. 7, 1973

[21] Appl. No.: 422,966

[52] U.S. Cl. .................. 55/396; 55/339; 55/397; 55/421; 55/455; 55/456; 55/485
[51] Int. Cl. .................................. B01d 45/16
[58] Field of Search .................. 55/337–339, 55/347, 348, 394, 396, 397, 452, 421, 455–458, 485

[56] References Cited
UNITED STATES PATENTS

| | | | |
|---|---|---|---|
| 2,193,883 | 3/1940 | Reeves | 55/337 |
| 2,662,610 | 12/1953 | Heinrich | 55/452 X |
| 3,633,342 | 1/1972 | Richardson | 55/396 UX |

FOREIGN PATENTS OR APPLICATIONS

| | | | |
|---|---|---|---|
| 628,212 | 8/1949 | United Kingdom | 55/452 |
| 711,304 | 6/1954 | United Kingdom | 55/396 |

Primary Examiner—Tim R. Miles
Assistant Examiner—William Cuchlinski, Jr.
Attorney, Agent, or Firm—Wofford, Felsman, Fails & Zobal

[57] ABSTRACT

The specification discloses a separator for removing heavier components from a gas stream and which, in the preferred embodiment, comprises a two-stage tubular separator located in a collection chamber and formed by an inlet conduit, a first stage separation conduit, a second stage separation conduit, and an outlet conduit. A gas swirl device is located in the inlet conduit for imparting a swirling motion to the gas stream entering the inlet conduit. It is located at a position sufficient to provide a gas swirl stabilization zone in the inlet conduit downstream of the gas swirl device. The downstream end of the inlet conduit is coaxially located within the upstram end of the first stage separation conduit defining an annular injection orifice for the entry of recirculating gas from the chamber. The second stage separation conduit has an upstream end coaxially located within the downstream end of the first stage separation conduit defining an annular ejection port for the removal of heavier components from the gas stream. In addition, the outlet conduit has an upstream end coaxially located within the downstream end of the second stage separation conduit defining an annular ejection orifice for the ejection into the chamber of remaining traces of the heavier components along with a portion of the gas for recirculation by way of the annular injection orifice.

23 Claims, 6 Drawing Figures

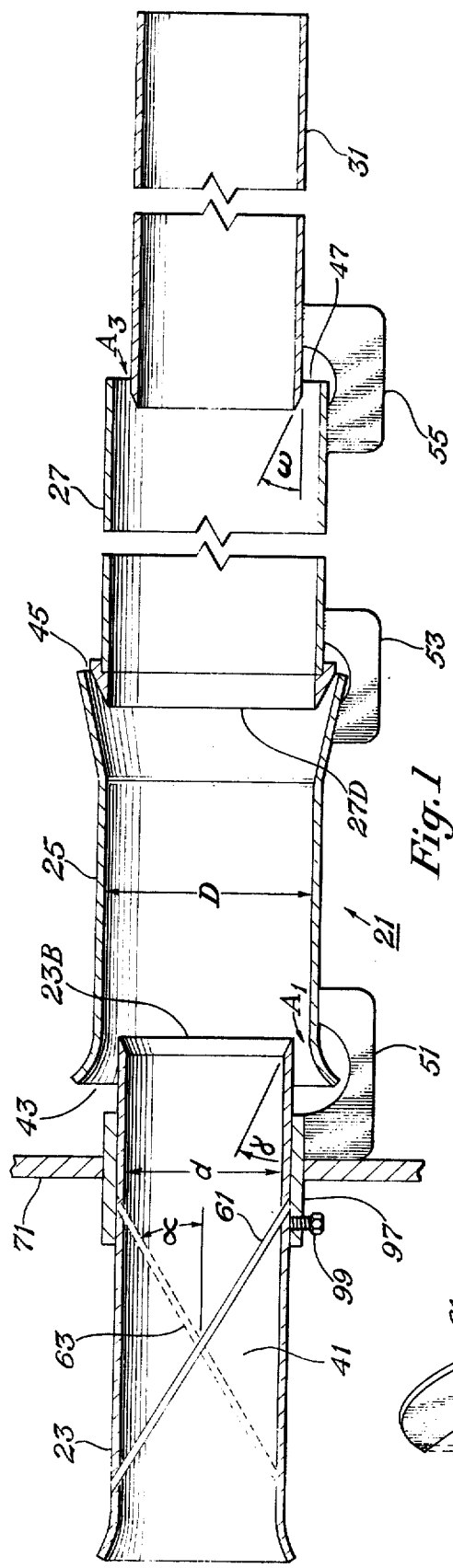
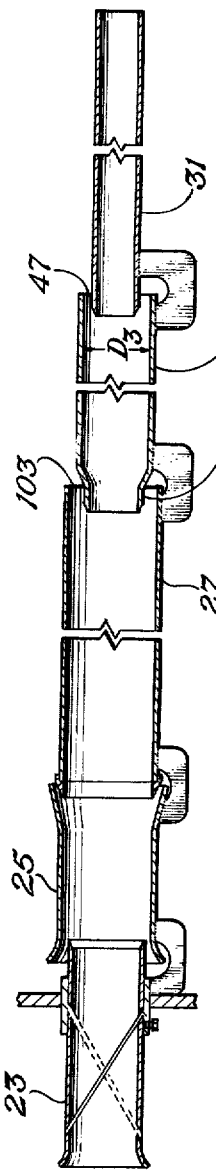
Fig. 1
Fig. 6
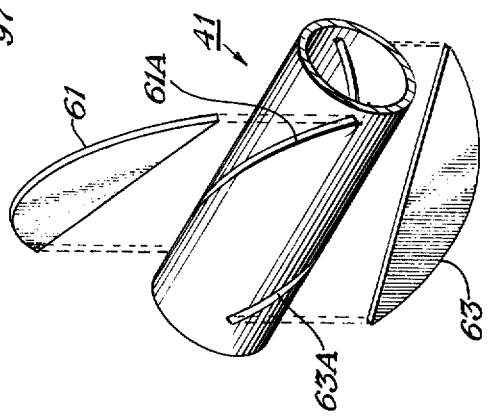
Fig. 4

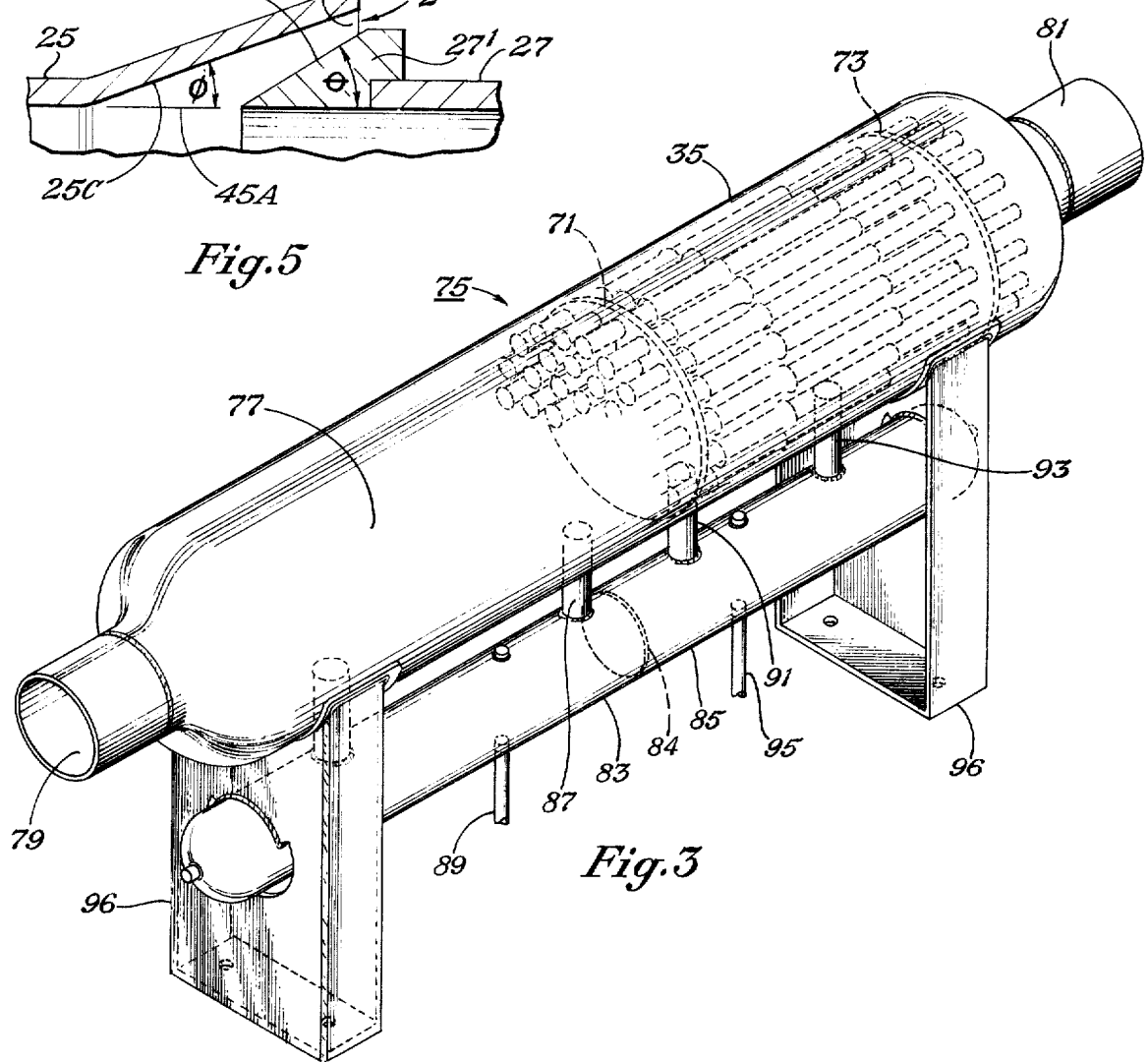

GAS-LIQUID SEPARATOR

BACKGROUND OF THE INVENTION

This application relates to a separator for removing liquid and solid components from a gas stream and more particularly to a tubular gas-liquid separator which imparts rotary motion to the gas stream to force heavier components against the separator tube wall which are then stripped off the tube wall through one or more ejection orifices or ports utilizing both inertial action and the sweep action of a recirculated gas stream.

In-line centrifugal or inertial gas liquid separators employing a separation gap for separating liquid from a gas stream have been built or proposed, however, those known have disadvantages in that they are inefficient in their separation process and hence leave much to be desired.

SUMMARY OF THE PRESENT INVENTION

It is an object of the present invention to provide a separator utilizing inertial action and recirculating gas for the highly efficient separation of heavier components from a gas stream with a minimum of pressure loss.

It is a further object of the present invention to provide a relatively inexpensive compact separator which is highly efficient and which has no stressed or moving parts and a flow pattern which offers almost unobstructed flow of a gas stream through the separator.

It is another object of the present invention to provide a tubular separation device for separating heavier immissible fluids from lighter fluids in a flowing mixed stream and which may be used as a single unit or with a plurality of other such units in a chamber to form a highly efficient separator that may be employed by itself or in combination with other phase separation systems.

In the preferred embodiment, the separator is a two-stage separator and comprises a chamber having an inlet conduit, a first stage separation conduit, a second stage separation conduit, and an outlet conduit which are axially aligned and located such that the inlet conduit extends into the chamber and the outlet conduit extends out of the chamber. The first and second stage separation conduits are located within the chamber between the inlet and outlet conduits. A gas swirl means is located in the inlet conduit for imparting a swirling motion to the gas stream. It is located at a position sufficient to provide a gas swirl stabilization zone in the inlet conduit downstream of the gas swirl means. The downstream end of the inlet conduit is coaxially located within the upstream end of the first stage separation conduit defining an annular injection orifice for the entry of recirculating gas from the chamber. The second stage separation conduit has an upstream end coaxially located within the downstream end of the first stage separation conduit defining an annular ejection port for the removal of the heavier components from the gas stream. In addition, the outlet conduit has an upstream end coaxially located within the downstream end of the second stage separation conduit defining an annular ejection orifice for the ejection into the chamber of remaining traces of the heavier components along with a portion of the gas for recirculation by way of the annular injection orifice. This recirculating gas provides a flow pattern to assist and facilitate removal through the ejection orifice of remaining traces of heavier components which may escape ejection through the first stage ejection port. The separated gas flows out of the separator by way of the outlet conduit while the heavier components separated from the gas stream are removed from the chamber by way of suitable removal means.

In one aspect, the ejection port is formed by an inward facing surface formed on the downstream end of the first stage separation conduit and an outward facing surface formed on the upstream end of the second stage separation conduit. The inward and outward facing surfaces flare outward in the downstream direction at different angles relative to the axis such that the distance between the inward and outward facing surfaces decreases at positions radially outward from the axis and in the downstream direction from the entrance to the ejection port.

In a further aspect, the first stage separation conduit has a minimum inside diameter which is greater than the outside diameter of the inlet conduit. The second stage separation conduit has an inside diameter which is about equal to the minimum inside diameter of the first stage separation conduit. In addition, the outlet conduit has an outside diameter less than the inside diameter of the second stage separation conduit.

Although the separator in the preferred embodiment comprises a two-stage separation system, a three-stage separation assembly can be provided by employing a third stage separation conduit between the second stage and the outlet conduit. In addition, a single stage separation assembly can be provided, if desired. Although the single stage system does not have the separation capabilities as the two-stage system, it has usefulness for separating liquid from gas streams which have a low liquid content.

BRIEF DESCRIPTION OF THE DRAWINGS

FIG. 1 illustrates tubular structure forming the two-stage separation unit of the preferred embodiment of the present invention;

FIG. 2 illustrates a single separation unit of the type disclosed in FIG. 1 located in a chamber;

FIG. 3 illustrates a plurality of the units of FIG. 1 located in a chamber;

FIG. 4 illustrates a swirl device located in the inlet of the structure of FIG. 1;

FIG. 5 is an enlarged cross sectional view of the ejection port of FIG. 1; and

FIG. 6 illustrates a modification of the present invention employing a three-stage separation assembly.

DETAILED DESCRIPTION OF THE INVENTION

Referring to FIG. 1, the two-stage separator assembly is identified by reference numeral 21 and comprises an inlet conduit 23, a first stage separation conduit 25, second stage separation conduit 27, and an outlet conduit 31. The assembly may be installed as a single unit in a chamber 33 as illustrated in FIG. 2 or a multiplicity of the units may be installed in a chamber 35 as illustrated in FIG. 3. The initial description will refer to the separation device 21 as being installed as a single unit in a housing chamber 33 for separating liquids from a mixed liquid-gas stream flowing in a pipeline which will be connected to the inlet conduit 23.

Referring to FIGS. 1 and 2, the two-stage separation device also comprises a gas swirl means 41 located in the inlet conduit 23; an injection orifice 43 for the recirculation of a portion of the gas from the chamber 33; an ejection port 45 for the ejection of most of the liquid from the gas stream; and an ejection orifice 47 for the ejection of remaining traces of the liquid and a portion of the gas stream for recirculation by way of the injection orifice 43. The gases separated from the liquid flow out of the separation device by way of the outlet conduit 31 which will be connected to the pipeline. The chamber 33 has a liquid reservoir 33a and a drain 33a' through which the separated liquids are removed. Support structure 49 is provided for supporting the chamber 33 at the desired height.

The conduits 23, 25, 27, and 31 are held and secured in axial alignment by way of spacers 51, 53, and 55. As illustrated in FIG. 2, the downstream end 23a of the inlet conduit 23 extends into the chamber 33 and is located coaxially within the upstream end 25a of the first separation conduit 25 to form the annular injection orifice 43. The upstream end 27a of the second stage separation conduit 27 is located coaxially within the downstream end 25b of the first stage separation conduit 25 to form the annular ejection port 45. In addition, the upstream end 31a of the outlet conduit is located coaxially within the downstream end 27b of the second stage separation conduit 27 to form the ejection orifice 47. The downstream end 31b of the outlet conduit extends out of the chamber 33 for connection to the pipeline.

In operation, the liquid-gas stream enters the separator by way of the inlet conduit 23 and is immediately contracted by the gas swirl device 41 which imparts an intense rotary motion to the stream, thus propelling the gas stream as well as the heavier components present in the gas stream towards the outer wall of the inlet conduit 23. This intense rotary motion is stabilized and restrained to travel in a confined path by the end 23a of the inlet conduit downstream of the swirl device 41. As the stream enters the first separation tube 25, the concentrated mass flow of gas and liquids in the vicinity of the orifice 43 produces a strong ejector or jet action at the orifice which results in the induction of gas from the liquid collection annulus of the chamber 33 and in the recirculation of a portion of the gas through the orifice 43 from the chamber 33.

The swirling gas stream from the swirl device 41 plus the portion of the recirculated gas stream entering the tubular separator at the injection orifice 43, thus enters the first stage spin or separation tube 25, where the heavier components are deposited on and flow around the wall of the tube 25, in a helical manner. When this helical flow of heavier components, flowing along the wall of the tube 25, is viewed in true perspective, it is a section of a parabola which is mathematically to the initial gas swirl angle produced by the swirl device 41. The liquid and other heavier components flowing in a helical pattern against the wall of conduit 25 will be ejected at the first stage ejection port 45 which is geometrically related to the section of the parabola described previously. Thus, the major portion of the liquids and other heavier components present in the gas stream are removed primarily by inertial action through port 45, with only a small amount of gas ejection and recirculation occurring at this point.

The gas stream leaving the spin tube 25, now almost completely stripped of liquids and other heavier components, enters the second stage spin tube 27 which acts as a flow stabilizer, in connection with the operation of the first stage ejection port 45, as well as to provide a deposition target and coalescing surface medium for any smaller particles or droplets that may have escaped ejection through port 45. These smaller particles or droplets travel within the wall boundary layer of the second stage tube 27 and at a much slower radial velocity, as compared to the inertial separation action occurring in the first stage tube 25. The smaller droplets are deposited and coalesced while traveling the length of the tube 27 and are ejected at the second stage ejection port or orifice 47. Ejection of liquids through orifice 47 is facilitated by the stripping action of the exit recirculating gas stream flowing from orifice 47 to orifice 43 by way of the chamber 33 and which flow constitutes the recirculating gas stream within the separator system. The ejection orifice 47 is constructed such as to produce a positive impact pressure within the chamber 33 which supplements the jet ejector action produced at orifice 43, thus further promoting gas circulation within the separator chamber 33.

Thus, the recirculating sweep gas feature provides a positive or driving force for expelling final traces of liquid droplets which may escape ejection from the first stage ejection port 45. If the liquid content of the gas stream is relatively low, all of the liquid may be stripped and ejected through the first port 45. When the liquid capacity of the first port 45 is exceeded, then the excess, the small amount of the liquid which escapes ejection through the port 45, will be deposited and collected on the wall of the second stage spin tube 27, and coalesced and ejected through the orifice 47, assisted by the sweep action of the recirculating gas stream, which in the major portion, also exits from orifice 47. Thus, the two stage separation system provides a very efficient device for removing liquid from a gas stream and is particularly useful in streams which have a relatively high content of liquid. It is also particularly useful in situations where surges of high liquid content in a gas stream may occur for example, in the removal and recovery of liquid hydrocarbons from gas well streams.

Consideration now will be given in more detail, to the above and other features of the separator. The recirculating gas flowing into orifice 43 has a lower velocity than that of the swirling gas stream within the inlet conduit 23. Thus, the energy imparted to the gas stream by the swirl device 41 must be in sufficient quantity so that between orifice 43 and port 45, the recirculating gas is able to effectively mix and become a part of the swirling gas stream prior to arrival to port 45 to allow liquid entrained in the recirculating gas to be deposited on the wall of the tube 25 for ejection through the port 45. The swirling velocity imparted to the gas stream is a function of the initial swirl angle $\alpha$. The device 41 is constructed to achieve the desired initial swirl angle $\alpha$ and in addition is located at a position in the inlet conduit 23 sufficient to form the desired stabilization zone in the inlet conduit 23 downstream thereof before entering into the first stage separation conduit 25.

The swirl device 41 in the preferred embodiment, comprises two or more semi-elliptical baffle plates arranged at a predetermined angle with respect to the longitudinal axis of the tube inlet. As illustrated in FIG. 1, two semi-elliptical baffle plates 61 and 63 are employed to form the swirl device 41. These plates are arranged at a predetermined angle $\alpha$ with respect to the longitudinal axis of the separator tube inlet. As illustrated in FIG. 4, the two plates 61 and 63 are inserted within slots 61a and 63a formed in the tubular conduit 23 at the desired angles to form the swirl device. The deflector plates each may be described as a one-half segment of an ellipse when divided along the major axis of the ellipse. In the preferred embodiment, α is equal to 30°. In this embodiment, the pair of half elliptical baffle plates are mounted at an angle of 60° with respect to each other, when viewed on the horizontal axis, and at the angle α equal to 30° with respect to the horizontal axis of gas flow through the separator tube body. The edges of the semi-elliptical baffle plates contact each other at the exact center of the retaining flow conduit 23.

It should be pointed out that a gas stream, when placed in a swirling motion in the separator tube assembly, as previously described, produces a free vortex that tends to assume a cylindrical and annular configuration, as limited by the confining walls of the separator tube assembly, thus leaving a zone of negative pressure within the core of the separator tube body. This negative pressure core induces the flow of a returning vortex at the center portion of the separator tube and is termed a "forced" vortex. The rotation of the forced vortex is in the same direction as the free vortex; however, the direction of flow is opposite from the normal flow of gas through the separator tube body assembly. This internal gas flow recycle within the separator tube body consumes energy and performs no useful function, insofar as the separation operation is concerned.

The swirl device 41 formed from the pair of semi-elliptical plates forms a hubless swirl device which is preferred in that it eliminates or minimizes the forced vortex effect, thus, increasing the overall efficiency of separation, per unit of energy expended in the form of pressure loss across the separator tube assembly. It is to be understood that the gas swirl device, however, could be a conventional deflector consisting of a multiplicity of helical vanes mounted on a central hub and so arranged that all of the gas passing through the vaned deflector system must come into contact with the deflector blades.

Referring now to FIG. 5, the first stage ejection port 45 is defined by an inward facing surface 25c formed on the downstream end of the first stage separation conduit 25 and by an outward facing surface 27c formed on the upstream end of the second stage conduit 27. In the embodiment disclosed, the surface 27c is a part of flange 27' which is welded to the conduit 27 and effectively is a part of the conduit 27. In a plane taken through and along the axis of the tubular assembly, surfaces 25c and 27c are straight surfaces. As illustrated in FIG. 5, the inward and outward facing surfaces 25c and 27c flare outward in the downstream direction at different angles Φ and θ relative to the axis such that the distance between the inward and outward facing surfaces decreases at positions radially outward from the axis and in the downstream direction from the entrance 45a to the ejection port. The angle θ is the average angle at that point of the vortex of the parabola inscribed by the liquids in their helical path around the wall of the conduit 25, while the angle Φ releases and controls the expansion of the vortex. Thus, the port 45 allows the liquids or entrained contaminants next to the wall their helical path to escape without the necessity of changing directions, or by inertial action alone. Moreover, since the ejection port 45 is frustro-conical shaped in cross section, there is provided a preliminary liquid collection zone which allows the liquids to be disengaged from the main stream prior to ejection. From tests, it has been found that an ejection port of this shape significantly increases the liquid separation capabilities of the separator, for example, over an annular gap having parallel and straight walls.

In the preferred embodiment, the inside diameter $d$ of inlet conduit 23 is equal to 3 inches while the inside diameter D of conduit 25 is equal to 4 inches. The inside diameter of conduit 27 also is equal to 4 inches while the inside diameter of outlet conduit 31 is equal to 3 inches. The initial swirl angle α is equal to 30° while the angle θ of port 45 is equal to 26°. The angle Φ of port 45 is equal to about 12°. The total overall length of the tubular separator assembly from end to end is 46.75 inches. The inlet conduit 23 has an overall length from end to end of 14 inches; the first stage separation conduit 25 has an end to end length of 9 inches; the second stage separation conduit 27 including flange 27' has an end to end length of 12 inches; while the outlet conduit 31 has an end to end length of 14 inches. The downstream end of inlet conduit 23 is inserted one inch into the upstream end of the first stage separation conduit 25. The upstream end of the second stage separation conduit 27 is inserted 0.687 of an inch into the downstream end of the first stage separation conduit 25. The upstream end of the outlet conduit 31 is inserted 0.562 of an inch into the downstream end of the second stage conduit 27. The distance from the end of the swirl device 41 to the end 23b of the inlet conduit 23 is equal to 1d while the effective length of the first stage separator tube 25 (the distance between the end 23b of tube 23 and the upstream end 27d of conduit 27) is equal to about $2.7d$, where $d$ is the inside diameter of the separator inlet tube 23. The annular area $A_1$ of the injection port 43 is equal to $0.47d^2$. The exit gap of the port 45 is equal to 0.1 of an inch and its annular area $A_2$ is equal to $0.17d^2$. The annular area $A_3$ of the orifice 47 is equal to $0.47d^2$. This area is sufficient to allow the excess liquid to be ejected as well as a portion of the gas stream to provide the recirculating feature. The inside diameter of the chamber 33 in the embodiment of FIG. 2 is equal to $0.89d^2$. The angles γ and ω are equal to 26°. The tubular separator with the data given above, can handle gas streams having velocities, measured at the inlet gas conduit 23, within the range of 32–150 feet per second and higher, within the allowable pressure loss across the separator. From tests, it has been determined that a range of from 11 percent to as much as 32 percent of the total flow entering the two-stage tubular assembly can be accounted for as recirculating gas within the separator chamber.

Since the port 45 is relatively short, the surfaces 25c and 27c may be straight when viewed in cross-section as illustrated and described above and the angle θ may be shown to be directly related to the spinner angle α by the following relationship:

$$\theta = \text{ARC TAN} \left[ \left( \frac{1}{\sqrt{(\text{TAN } \alpha \pi D)^2 + (\pi D)^2}} \right) \right] \quad (1)$$

where D is the diameter as described above and illustrated in FIG. 1

In the embodiment of the two-stage separator assembly of FIG. 1, it is desirable that the second stage 27 have an inside diameter which is the same as the inside diameter D of the first separation conduit 25 in order to minimize pressure loss through the separator. In the preferred embodiment, the pressure loss through the separator may be as little as 0.25 psi. The inside diameter of the chamber 33 should be of sufficient cross sectional area to allow separation of the liquid from the recirculating gas in the chamber as well as to provide a flow conduit of sufficient cross sectional area, so that negligible pressure loss will occur in the passage of the recirculated gas stream from 47 to 43.

In actual tests, it has been found that the two-stage separator of FIG. 1 has a 10-to-20 fold increase in capacity over a single stage separator and is greater than if two single stage separators are employed in series but installed in separate vessels. This is due to the cooperative separation action of the two ejection ports 45 and 47.

Although in the preferred embodiment, the inside diameters of the conduits 23, 31, and 25, 27 are three and four inches respectively, other diameters may be employed. The inside diameters of conduits 25 and 27 and other dimensions of the separator, however, will be a function of the inside diameter of conduit 23.

The swirl angle selected for the gas swirl baffle plates 61 and 63 is determined on the basis of allowable pressure loss across the separator, as well as the quantity and size of the droplets and particulate matter to be removed are recovered from the gas stream. In the preferred embodiment wherein inlet conduit 23 has an inside diameter of three inches, optimum liquid recoveries at a minimum pressure loss can be effected at an initial swirl angle of 30°, as related to the longitudinal axis. Greater or lesser angles may be utilized for special operating conditions, as may be encountered in the gas stream to be processed. In a case where extremely small droplets or particulate matter is to be removed from a gas stream, it may be desirable to use a gas swirl device with an angle of 45° with respect to the longitudinal axis. It is to be understood that if $\alpha$ is different than 30°, the angle $\theta$ will be appropriate modified in accordance with equation (1).

In the embodiment of FIG. 3, a plurality of the tubular two-stage separators are located at equally spaced apart positions in a chamber 35. This chamber is formed between plates or sheets 71 and 73 and is located in the downstream end of a container 75. Located in the upstream end of the container 71 in the zone illustrated at 77 is a preliminary separator (internal details not shown) which however, may be a conventional settling separator or any modification thereof. The mixed gasliquid stream will be applied to inlet 79. The flow path of the gas will be through the preliminary separator in zone 77 and through the two-stage assemblies in chamber 35. The resulting separated gas will flow out through outlet 81. A liquid reservoir system is provided comprising a separate reservoir 83 for draining liquids from the preliminary separator located in zone 77 and a separate reservoir 85 for draining liquids from the chamber 35 in which are located the plurality of tubular two-stage separators of the present invention. Plate 84 separates reservoirs 83 and 85. The liquid removed by the separator in zone 77 is applied to the reservoir 83 by way of a drain conduit 87 and is drained from the reservoir 83 by way of conduit 89. Two drain conduits 91 and 93 extend to the reservoir 85 from chamber 35 and a drain 95 is employed to drain the liquid from this reservoir. The container 77 and reservoirs 83 and 85 are supported by supports 96.

In the embodiment of FIG. 3, the inlet conduits 23 are supported and located in apertures formed through the tube sheet 71, as also illustrated in FIG. 1. The outlet conduits 31 will be located and supported in apertures formed through the other tube sheet 73. As shown in FIG. 1, each inlet conduit is inserted through a sleeve 97 secured in each opening formed through the sheet 71 and the inlet conduit located within the sleeve. Each conduit 23 may be adjusted to the desired position and held in place by a set screw 99. Also, each conduit 23 is readily replaceable, should corrosion or erosion occur at this point.

The arrangement of FIG. 3 is employed for separating liquids from a gas stream in which the gas stream has a very high content of liquid. By employing the separators of the present invention in combination with the settling or other type separator, all of the liquid can be completely stripped from the gas stream with a minimum amount of equipment. In this respect, the settling separator may be made relatively small to separate a large portion of the liquid from the gas stream, the remaining of which is removed completely by the plurality of two-stage separators located in the chamber 35.

In the embodiment of FIG. 3, 42-stage separator assemblies are located within the chamber 35 and which has an inside diameter of 42 inches.

Although the embodiments of FIGS. 2 and 3 illustrate the single two-stage separation assembly and the multiplicity of two-stage separation assemblies as being located horizontally, it is to be understood that in each embodiment, the assembly or the multiplicity of assemblies and their chambers may be located in vertical or angular positions dependent upon the situation desired.

Reference is made again to FIG. 1 for other details of the two-stage separation assembly. Although only three connecting members 51, 53, and 55 are illustrated as employed for connecting the tubular assembly together, it is to be understood that there are three connecting members 51 located 120° apart having their upstream ends connected to sleeve 97 and their downstream ends connected to the conduit 25. Similarly, there are three connecting members 53 located 120° apart having their upstream ends connected to conduit 25 and their downstream ends connected to conduit 27. Three connecting members 55 are employed which are also located 120° apart and which have their upstream ends connected to conduit 27 and their downstream ends connected to conduit 31.

If desired, a three-stage separation may be employed to increase the separation capacity even more by employing a third stage separation conduit downstream of the first stage separation conduit, as illustrated in FIG. 5. In this figure, the third stage separation conduit is identified at 101 and has a smaller upstream end 101a which is located within the downstream end of the second stage separation conduit 27. The outlet conduit 31 has its upstream end located in the downstream end of the third stage separation conduit 101 forming ejection orifice 37. The upstream end 101a, when located within the downstream end of the second stage separation conduit 27 forms a second ejection port 103 between port 45 and orifice 47 for the ejection of liquid which escapes ejection through port 45. Any remaining traces of liquid will be ejected through the port 47 along with a portion of the gas for recirculation purposes as ejected from 103 and 47. The embodiment of FIG. 6 could be employed on a gas stream which has a relatively high liquid content. It may be employed as a single unit in chamber 33 or a multiplicity thereof may be employed in chamber 35.

As indicated above, if the liquid content of the gas stream is relatively low, then a single stage assembly may be employed. The single stage assembly will have the same configuration as the assembly of FIG. 1 except that the conduit 31 will be eliminated and the conduit 27 employed as the outlet conduit. In order to accomplish this purpose, the conduit 27 will be elongated or the chamber shortened whereby its downstream end will extend out of the chamber. In this embodiment, the conduit 27 will have an inside diameter which will be the same as the inside diameter D of conduit 25. The orifice 47 thus will be eliminated but port 45 retained with its same shape. Liquids will be ejected through port 45 as well as gas for recirculation. The single stage assembly may be employed as a single unit in chamber 33 or a multiplicity thereof may be employed in chamber 35.

A few typical applications for the separator of the present invention, particularly the two embodiments employing one or more two-stage assemblies, are listed as follows.

Removal of trace liquids from clean gases flowing under normal gas pipeline transmission conditions.

Removal of water and/or oil from the discharge gas from reciprocating gas compressors.

Removal of trace quantities of liquid hydrocarbons from fuel gas streams.

Separation of amines, glycols, and sulfinols from processed natural gas streams, as well as the finely divided solids found to be in suspension in these organic liquids.

Removal of oil and/or condensate from exhaust steam, prior to condensation or venting to the atmosphere.

Separation of condensate or entrainment from steam, prior to super heat for power generation.

Removal and recovery of liquid hydrocarbons from wet natural gas well streams operating at high oil gas ratios.

Removal of free water from gas streams entering solid dessicant or glycol type dehydrator systems.

Removal of synthetic lubricants from gas compressor discharge streams.

Removal of synthetic lubricants from gas turbine fuel gas supplies.

It is to be understood also that the separator of the present invention may be employed to separate and recover solids from gases in the "bone-dry" stage with a high degree of efficiency of recovery. Particulate solids may be efficiently removed from the bone-dry gas streams by the injection of a small quantity of a compatible liquid contacting agent, such as absorption oil, glycol, water, etc. Injection of the liquid may be in the inlet conduit upstream of the swirl device. The injected liquid would then act as a fluidizing agent, and entrap the particulate solids, and allow such solids to accumulate and be drained from the separator or chamber. The injected liquid can be recirculated, and suspended solids recovered by filtration, settling, or other well known means. The liquid that is injected into the gas stream should have the capability of readily wetting the solid particulate matter present in the gas stream.

The separator of the present invention may also be utilized for the simultaneous removal of solid particulate matter, as well as the absorption of gaseous impurities that might be present in a gas stream. For example, a solution of sodium carbonate may be utilized for the concurrent removal of fly ash and sulfur dioxide from the flue gas from a coal fired steam boiler. At present, the well known venturi type scrubber is used for this service; however, the venturi scrubber requires a separator following the scrubber, for the recovery of the scrubber liquid. This is not necessary with the separator of the present invention, since it provides both the scrubbing action as well as scrubbing fluid separation means within the same vessel housing. An example of simultaneous solid particulate removal and gas conditioning would involve the injection of diethylene glycol into a gas stream for the concurrent removal of solids, liquids, a well as partial removal of water vapor from the gas stream. The diethylene glycol may be recirculated after reboiling to remove water, and filtration for the removal of solids.

We claim:

1. A separator for removing from a gas stream, heavier components present in the gas stream, comprising:

a housing chamber, a gas stream inlet conduit extending into said chamber and having an upstream end and a downstream end, the latter of which is located in said chamber, gas swirl means located in said inlet conduit for imparting a swirling motion to the gas stream, a separation conduit axially aligned with said inlet conduit, the downstream end of said inlet conduit being coaxially located within the upstream end of said separation conduit defining an annular injection orifice for the entry of recirculating gas from said chamber, conduit means axially aligned with said inlet conduit and said separation conduit and having an upstream end coaxially located within the downstream end of said separation conduit defining an annular ejection port for the removal of said heavier components from said gas stream, said separation conduit between said downstream end of said inlet conduit and said upstream end of said conduit means and from its axis radially outward to its surrounding wall being free of internal structure, said annular ejection port being formed by an inward facing surface formed on the downstream end of said separation conduit and by an outward facing surface formed on the upstream end of said conduit means, said inward and outward facing surfaces flaring outward in the downstream direction at different angles relative to the axis such that the distance between said flared inward and outward facing surfaces decreases at positions radially outward from the axis and in the downstream direction from the entrance to said ejection port, said conduit means including a downstream end extending out of said chamber for the passage of gas separated from said heaview components, and means for removing from said chamber said components separated from the gas stream.

2. The separator of claim 1 wherein:
said separation conduit has a minimum inside diameter which is greater than the outside diameter of said inlet conduit,
the upstream portion of said conduit means has an inside diameter which is equal to said minimum inside diameter of said separation conduit.

3. The separator of claim 1 wherein:
said conduit means defines an outlet conduit having its downstream end extending out of said housing,
said outward facing surface of said ejection port is formed on the upstream end of said outlet conduit,
said outlet conduit between its upstream end and its downstream end and from its axis radially outward to its surrounding wall being free of internal structure.

4. The separator of claim 3 wherein:
said separation conduit has a minimum inside diameter which is greater than the outside diameter of said inlet conduit,
said outlet conduit has an inside diameter which is equal to said minimum inside diameter of said separation conduit.

5. The separator of claim 1 wherein:
said separation conduit defines a first stage separation conduit,
said conduit means comprises:
a second stage separation conduit and an outlet conduit axially aligned with said first stage separation conduit,
said second stage separation conduit having an upstream end coaxially inserted into the downstream end of said first stage separation conduit,
said outward facing surface defining a portion of said annular ejection port being formed on the upstream end of said second stage separation conduit,
said outlet conduit having its upstream end coaxially inserted into the downstream end of said second stage separation conduit defining an annular discharge orifice for the ejection into said chamber of remaining traces of said heavier components along with a portion of the gas for recirculation through said annular injection orifice.

6. The separator of claim 5 wherein:
said first stage separation conduit has a minimum inside diameter which is greater than the outside diameter of said inlet conduit,
said second stage separation conduit having an inside diameter which is about equal to said minimum inside diameter of said first separation conduit,
said outlet having an outside diameter less than the inside diameter of said second separation conduit.

7. The separator of claim 1 wherein:
said separation conduit defines a first stage separation conduit,
said conduit means comprises:
a second stage separation conduit; a third stage separation conduit; and an outlet conduit all of which are axially aligned with said first stage separation conduit,
said second stage separation conduit having an upstream end coaxially inserted into the downstream end of said first stage separation conduit,
said outward facing surface defining a portion of said annular ejection port being formed on the upstream end of said second stage separation conduit,
said third stage separation conduit having an upstream end coaxially inserted into the downstream end of said second stage separation conduit defining a second annular ejection port,
said outlet conduit having its upstream end coaxially inserted into the downstream end of said third stage separation conduit defining an annular discharge orifice for the ejection into said chamber of remaining traces of said heavier components along with a portion of the gas for recirculation through said annular injection orifice.

8. The separator of claim 7 wherein:
said first stage separation conduit has a minimum inside diameter which is greater than the outside diameter of said inlet conduit,
said second stage separation conduit has an inside diameter which is about equal to said minimum inside diameter of said first stage separation conduit,
said third stage separation conduit has an inside diameter along the major part of its length which is about equal to the inside diameter of said second stage separation conduit,
said outlet conduit has an outside diameter which is less than said inside diameter of said third stage separation conduit.

9. A separator for removing from a gas stream, heavier components present in the gas stream, comprising:
a housing chamber,
a gas stream inlet conduit extending into said chamber and having an upstream end and a downstream end, the latter of which is located in said chamber,
gas swirl means located in said inlet conduit for imparting a swirling motion to the gas stream,
said gas swirl means being located at a position spaced from said downstream end sufficient to provide a gas swirl stabilization zone in said inlet conduit downstream of said gas swirl means,
a separation conduit axially aligned with said inlet conduit,
the downstream end of said inlet conduit being coaxially located within the upstream end of said separation conduit defining an annular injection orifice for the entry of recirculating gas from said chamber,
said separation conduit having a minimum inside diameter which is greater than the outside diameter of said inlet conduit,
an outlet conduit axially aligned with said separation conduit and having its downstream end extending out of said chamber,
said outlet conduit having an upstream end coaxially located within the downstream end of said separation conduit defining an annular ejection port for the removal of said heavier components from said gas stream along with a portion of the gas for recirculation through said annular injection orifice,
said annular ejection port being formed by an inward facing surface formed on the downstream end of said separation conduit and by an outward facing surface formed on the upstream end of said outlet conduit,
said inward and outward facing surfaces flaring outward in the downstream direction at different angles relative to the axis such that the distance between said flared inward and outward facing surfaces decreases at positions radially outward from the axis and in the downstream direction from the entrance to said ejection port, said outlet conduit having a cylindrical inside surface with a diameter which is about equal to said minimum inside diameter of said separation conduit, said separation conduit between said downstream end of said inlet conduit and said upstream end of said outlet conduit and from its axis radially outward to its surrounding wall being free of internal structure, said outlet conduit between its upstream end and its downstream end and from its axis radially outward to its surrounding wall being free of internal structure, and means for removing from said housing chamber said components separated from the gas stream.

10. A separator for removing from a gas stream, heavier components present in the gas stream, comprising:

a housing chamber, a gas stream inlet conduit extending into said chamber and having an upstream end and a downstream end, the latter of which is located in said chamber, gas swirl means located in said inlet conduit for imparting a swirling motion to the gas stream, said gas swirl means being located at a position sufficient to provide a gas swirl stabilization zone in said inlet conduit downstream of said gas swirl means, a first stage separation conduit axially aligned with said inlet conduit, the downstream end of said inlet conduit being coaxially located within the upstream end of said first stage separation conduit defining an annular injection orifice for the entry of recirculating gas from said chamber, a second stage separation conduit axially aligned with said first stage separation conduit, said second stage separation conduit having an upstream end coaxially located within the downstream end of said first stage separation conduit defining an annular ejection port for the removal of said heavier components from said gas stream, an outlet conduit axially aligned with said second stage separation conduit and having a downstream end extending out of said chamber for the passage of gas separated from said heavier components, said outlet conduit having an upstream end coaxially located within the downstream end of said second stage separation conduit defining an annular ejection orifice for the ejection into said chamber of remaining traces of of said heavier components along with a portion of the gas for recirculation through said annular injection orifice, and means for removing from said chamber said components separated from the gas stream.

11. The separator of claim 10 wherein:

said annular ejection port is formed by an inward facing surface formed on the downstream end of said first stage separation conduit and by an outward facing surface formed on the upstream end of said second stage separation conduit, said inward and outward facing surfaces flaring outward in the downstream direction at different angles relative to the axis such that the distance between said inward and outward facing surfaces decreases at positions radially outward from the axis and in the downstream direction from the entrance to said ejection port.

12. The separator of claim 11 wherein:

said first stage separation conduit has a minimum inside diameter which is greater than the outside diameter of said inlet conduit, said second stage separation conduit has an inside diameter which is about equal to said minimum inside diameter of said first stage separation conduit, said outlet conduit has an outside diameter less than said inside diameter of said second stage separation conduit.

13. The separator of claim 11 wherein said gas swirl means comprises:

at least two plates located in said inlet conduit at a predetermined angle $\alpha$ with respect to the longitudinal axis of said inlet conduit for producing a helical flow around the wall of said first stage separation conduit which is a section of a parabola, the angle $\theta$ of said outer surface of said annular port with respect to the axis being defined as follows:

$$\theta = \text{ARC TAN} \left[ \left( \frac{\sqrt{(\text{TAN } \alpha \pi D)^2 + (\pi D)^2}}{\text{TAN } \alpha \pi D} \right) \right]$$

where D is the inside diameter of said first stage separation conduit.

14. The separator of claim 10 wherein:

said first stage separation conduit has a minimum inside diameter which is greater than the outside diameter of said inlet conduit, said second stage separation conduit has an inside diameter which is about equal to said minimum inside diameter of said first stage separation conduit, said outlet conduit has an outside diameter less than said inside diameter of said second stage separation conduit.

15. A separator for removing from a gas stream, heavier components present in the gas stream, comprising:

a housing chamber, a gas stream inlet conduit extending into said chamber and having an upstream and a downstream, said gas swirl means being located at a position sufficient to provide a gas swirl stabilization zone in said inlet conduit downstream of said gas swirl means, a first stage separation conduit axially aligned with said inlet conduit, the downstream end of said inlet conduit being coaxially located within the upstream end of said first stage separation conduit defining an annular injection orifice for the entry of recirculating gas from said chamber, a second stage separation conduit axially aligned with said first stage separation conduit, said second stage separation conduit having an upstream end coaxially located within the downstream end of said first stage separation conduit defining a first annular ejection port for the removal of said heavier components from said gas stream, a third stage separation conduit axially aligned with said second stage separation conduit, said third stage separation conduit having an upstream end coaxially inserted into the downstream end of said second stage separation conduit defining a second annular ejection port, an outlet conduit axially aligned with said third stage separation conduit and having a downstream end extending out of said housing for the passage of gas separated from said heavier components, said outlet conduit having an upstream end coaxially located within the dowstream end of said third stage separation conduit defining an annular ejection orifice for the ejection into said chamber of remaining traces of said heavier components along with a portion of the gas for recirculation through said annular injection orifice, and, means for removing from said chamber, said components separated from the gas stream.

16. The separator of claim 15 wherein:

said first annular ejection port is formed by an inward facing surface formed on the downstream end of said first stage separation conduit and by an outward facing surface formed on the upstream end of said second stage separation conduit, said inward and outward facing surfaces flaring outward in the downstream direction at different angles relative to the axis such that the distance between said inward and outward facing surfaces decreases at positions radially outward from the axis and in the downstream direction from the entrance to said first ejection port.

17. The separator of claim 15 wherein:

said first stage separation conduit has a minimum inside diameter which is greater than the outside diameter of said inlet conduit, said second stage separation conduit has an inside diameter which is about equal to said minimum inside diameter of said first stage separation conduit, said third stage separation conduit has an inside diameter along the major portion of its length which is about equal to said inside diameter of said second stage separation conduit, said outlet conduit has an outside diameter which is less than said inside diameter of said third stage separation conduit.

18. The separator of claim 17 wherein:

said first stage separation conduit has a minimum inside diameter which is greater than the outside diameter of said inlet conduit, said second stage separation conduit has an inside diameter which is about equal to said minimum inside diameter of said first stage separation conduit, said third stage separation conduit has an inside diameter along the major portion of its length which is about equal to said inside diameter of said second stage separation conduit, said outlet conduit has an outside diameter which is less than said inside diameter of said third stage separation conduit.

19. A separator for removing from a gas stream, heavier components present in the gas stream, comprising:

a housing chamber, a tubular shaped passageway, circular in cross section, extending through said chamber and including:

a gas stream inlet extending into said chamber and an outlet spaced from said inlet and extending out of said chamber for the passage of gas separated from said heavier components, gas swirl means located in said inlet for imparting a swirling motion to the gas stream, an injection orifice downstream of said gas swirl means for the entry of recirculating gas into said passageway from said chamber, an ejection port spaced downstream of said injection orifice for the removal of said heavier components from said gas stream, and an ejection orifice spaced downstream of said ejection port for the ejection into said chamber of remaining traces of said heavier components along with a portion of the gas from said passageway for recirculation through said injection orifice, the portion of said passageway between said injection orifice and ejection port having a minimum diameter greater than that of said inlet and about equal to that of said portion of said passageway between said ejection port and said ejection orifice, said passageway between said gas swirl means and said outlet and from its axis radially outward to its periphery being free of internal structure, and means for removing from said chamber, said heavier components separated from said gas stream.

20. The separator of claim 19 wherein said ejection port is formed by inward and outward facing surfaces flaring outward from the outer periphery of said passageway in the downstream direction at different angles relative to the axis of said passageway such that the distance between said flared inward and outward facing surfaces decreases at positions radially outward from said axis and in the downstream direction from the entrance to said ejection port.

21. The separator of claim 20 wherein:

said passageway on the upstream side of said ejection port flares outward from a given diameter forming said inward facing surface, said passageway comprises a cylindrical portion located radially inward from said outward facing surface, said cylindrical portion of said passageway and a section downstream thereof have a diameter equal to that of said given diameter.

22. A two-stage tubular separating assembly to be located in a chamber for removing from a gas stream, heavier components present in the gas stream, comprising:

a gas stream inlet conduit having an upstream and downstream end, the latter of which is to be located in the chamber, gas swirl means located in said inlet conduit for imparting a swirling motion to the gas stream, said gas swirl means being located at a position sufficient to provide a gas swirl stabilization zone in said inlet conduit downstream of said gas swirl means, a first stage separation conduit axially aligned with said inlet conduit, the downstream end of said inlet conduit being coaxially located within the upstream end of said first stage separation conduit defining an annular injection orifice for the entry of recirculating gas from the chamber, a second stage separation conduit axially aligned with said first stage separation conduit, said second stage separation conduit having an upstream end coaxially located within the downstream end of said first stage separation conduit defining an annular ejection port for the removal of said heavier components from said gas stream, an outlet conduit axially aligned with said second stage separation conduit and having a downstream end to extend out of the chamber for the passage of separated gas, said outlet conduit having an upstream end coaxially located within the downstream end of said second stage separation conduit defining an annular ejection orifice for the ejection into the chamber of remaining traces of said heavier components along with a portion of the gas for recirculation through said annular injection orifice.

23. A separator comprising a chamber having a plurality of the assemblies of claim 22 located in the chamber at spaced apart positions, each assembly having its inlet conduit extending into the chamber and its outlet conduit extending out of the chamber.

* * * * *